United States Patent [19]

Iggulden et al.

[11] Patent Number: 4,896,355

[45] Date of Patent: Jan. 23, 1990

[54] PATTERNING DEVICE FOR SECURITY FACSIMILE SYSTEMS

[75] Inventors: Jerry R. Iggulden, 21600 Cleardale St., Santa Clarita, Calif. 91321; Donald A. Streck, 832 Country Dr., Ojai, Calif. 93023

[73] Assignees: Donald A. Streck, Ojai; Jerry R. Iggulden, Santa Clarita, both of Calif. ; a part interest

[21] Appl. No.: 325,400

[22] Filed: Mar. 20, 1989

Related U.S. Application Data

[63] Continuation-in-part of Ser. No. 312,700, Feb. 21, 1989, Continuation-in-part of Ser. No. 175,947, Mar. 31, 1988.

[51] Int. Cl.[4] ........................ G03B 27/00; H04N 1/44; G09C 5/00

[52] U.S. Cl. ........................................ 380/54; 283/17; 283/73; 283/902; 355/201; 380/18

[58] Field of Search ........................... 283/902, 17, 73; 355/201, 133; 380/14, 18, 54

[56] References Cited

U.S. PATENT DOCUMENTS

| | | | |
|---|---|---|---|
| 2,417,163 | 3/1947 | Horst . | |
| 3,718,349 | 2/1973 | Small | 283/73 |
| 3,914,877 | 10/1975 | Hines . | |
| 4,586,711 | 5/1986 | Winters . | |
| 4,682,954 | 7/1987 | Cook | 283/17 |
| 4,776,013 | 10/1988 | Kafri et al. | 380/54 |
| 4,786,941 | 11/1988 | Regan | 283/17 |

*Primary Examiner*—Stephen C. Buczinski
*Attorney, Agent, or Firm*—Donald A. Streck

[57] ABSTRACT

A device for photocopying a document to produce two partial documents for secure transmission. A transparent sheet is placed on the cover glass and has a pattern thereon of portions which are complementary along longitudinally equal shift distances. There is a frame having the transparent sheet attached to the bottom thereof and including parallel side members. A holder is disposed within the frame and on the transparent sheet between the side members for longitudinal sliding a document over the pattern between a first position and a second position located at the equal shift distance. The holder comprises a top member and a transparent carrier member slidably disposed on the transparent sheet and attached to the top member for sliding movement in combination therewith with a document to be photocopied therebetween. The holder is moveable between the first position and the second position. A combined stop and detent prevents the holder from sliding too far and resiliently holds the holder in the positions. The top member includes a gripping tab extending beyond the frame for gripping to move the top member between the positions. Touch fastener material may be employed to releasably attach the gripping tab to a surface of the photocopy machine so that the frame can be moved relative to the top member to prevent document top/bottom margin loss.

28 Claims, 3 Drawing Sheets

PATTERNING DEVICE FOR SECURITY FACSIMILE SYSTEMS

This application is a continuation-in-part of application Ser. No. 312,700, filed Feb. 21, 1989 which, in turn, is a continuation-in-part of application Ser. No. 175,947, filed Mar. 31, 1988.

BACKGROUND OF THE INVENTION

This invention relates to facsimile transmission systems and methods for sending a document between a sender and a receiver by facsimile in a manner which prevents unauthorized casual reading of the document, and, more particularly, to a device for photocopying a document employing a standard photocopy machine having a cover glass upon which documents to be copied are placed to produce two partial documents each containing portions of the document which are complementary and mutually exclusive, the device comprising a transparent sheet sized to be placed on the cover glass and having a pattern thereon of white and transparent portions which are complementary along longitudinally equal shift distances; holder means for holding a document over the pattern and disposed on the transparent sheet; and, moving means for moving the holder means between a first position and a second position located longitudinally at the equal shift distance from the first position.

In above-referenced, co-pending '700 application, the teachings of which are incorporated herein by reference, a method and associated apparatus is disclosed by means of which a document can be transmitted between a sender and a receiver by facsimile in a manner which prevents unauthorized casual reading of the document. The method and an associated mechanical apparatus for practicing the method are shown in simplified form in FIGS. 1-5. As depicted in FIGS. 1 and 2, a pair of patterns 10 and 12 are alternately placed over the document 14 while it is scanned (either by a photocopy machine or the scanning head of a facsimile machine). Each pattern 10, 12 contains white portions 16 on a transparent background thus creating transparent portions 18. The patterns 10, 12 are complementary and mutually exclusive; that is, the "A" pattern 10 of FIG. 1 has white portions 16 where the "B" pattern 12 of FIG. 2 has transparent portions 18, and vice versa. Thus, when the document 14 of FIG. 3 is scanned through the "A" pattern 10 of FIG. 1 the partial document 14' of FIG. 4 is produced. Similarly, when the document 14 of FIG. 3 is scanned through the "B" pattern 12 of FIG. 2 the partial document 14" of FIG. 5 is produced. The two partial documents 14', 14" are then transmitted by facsimile to the receiver. At the receiving end, the two partial documents 14', 14" are difficult to read and understand, at least to the casual observer. The intended receiver, however, makes a copy of one of the two partial documents 14', 14" and only has to place the transparent copy over the other partial document in proper registration in order to view (and copy, if desired) the reconstructed document 14.

The co-pending '700 application also discloses a method of creating the partial documents 14', 14" for facsimile transmission employing computer software. That, however, is not the area addressed by this invention. As can be appreciated, if two separate physical patterns 10, 12 are employed in scanning the document 14, registration of the document 14 on patterns 10, 12 can be a problem. Of course, if copying of the document 14 is not accomplished with the patterns 10, 12 in proper registration, the partial documents 14' and 14" will contain duplicate and missing information. The duplicate information is not a problem as it merely overlaps when the transparency overlay and registration process is accomplished by the receiver. Missing information, however, is missing forever. The problem of registration is particularly severe when non-rectangular documents of irregular size and/or shape are to be copied for secure transmission.

Wherefore, it is the object of this invention to provide a patterning device for use with the method of the co-pending '700 application which eliminates the registration problem and can be used with irregular sized and shaped documents.

Other objects and benefits of this invention will become apparent from the detailed description which follows hereinafter when taken in conjunction with the drawing figures which accompany it.

Summary

The foregoing object has been achieved by the patterning device of the present invention for photocopying a document employing a standard photocopy machine having a cover glass upon which documents to be copied are placed to produce two partial documents each containing portions of the document which are complementary and mutually exclusive. The device comprises, a transparent sheet sized to be placed on the cover glass and having a pattern thereon of white and transparent portions which are complementary along longitudinally equal shift distances; a rectangular frame having the transparent sheet attached to a bottom surface thereof and including parallel side members spaced such that a document to be photocopied can be disposed between them; holder means disposed within the frame and on the transparent sheet between the side members for holding a document over the pattern and for longitudinal sliding movement between a first position and a second position located at the equal shift distance from the first position; and, moving means for moving the holder means between the first position and the second position.

The preferred embodiment includes combined stop and detent means for preventing the holder means from sliding longitudinally a distance longer than between the first and second positions and for resiliently holding the holder means in the first and second positions. Preferably, this comprises a double keyhole slot longitudinally disposed in the holder means and having circular holes on ends thereof separated by a connecting slot of a width less than a diameter of the holes; and, a peg carried by the transparent sheet and of a diameter equal to the holes disposed through the double keyhole slot.

The preferred holder means comprises a rectangular top member slidably disposed between the side members and a transparent, rectangular carrier member slidably disposed on the transparent sheet and attached to the top member for sliding movement in combination therewith whereby a document to be photocopied can be placed between the top member and the carrier member to move in combination therewith. Preferably, the carrier member is hingedly attached to the top member adjacent a top end thereof and the top member is resiliently flexible whereby the top member can be rolled away from the carrier member towards the top end to allow a document to be placed between the top member and the carrier member or be removed therefrom.

The preferred top member includes a gripping tab means extending beyond the frame for gripping to move the top member between the first and second positions.

For an alternate method of operation, there are means for releasably attaching the gripping tab means to a surface of the photocopy machine whereby the frame can be moved relative to the top member to affect relative movement between the first and second positions.

DESCRIPTION OF THE PREFERRED EMBODIMENT

Figure 6:
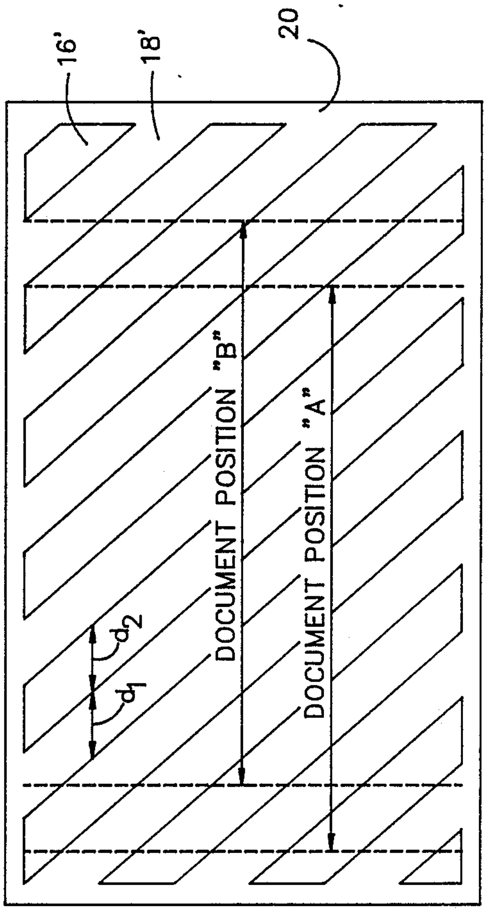
FIG. 6 is a simplified drawing depicting the basic pattern construction technique upon which the invention of this continuation-in-part application is based.

The document patterning device of this application is based on a particular pattern construction as depicted by way of example in FIG. 6. While a series of diagonal stripes are employed to create the complementary and mutually exclusive "A" and "B" patterns as described above, as those skilled in the art will be quick to recognize and appreciate, other patterns having the required characteristics could also be used with the patterning device to be described herein. For example, the pattern could consist of alternating white and transparent "crosses" where the width of the crossbars is equal to the depth of the crossbars. The only requirement is that the pattern of white and transparent portions 16, 18 be complementary along equal longitudinal shift distances. Again, as those skilled in the art will recognize, the pattern could be a radial pattern which is complementary in equal radial distances; however, most documents and copying devices are oriented to a rectangular structure and, therefore, the rectangular approach of FIG. 6 is preferred.

Figure 1:
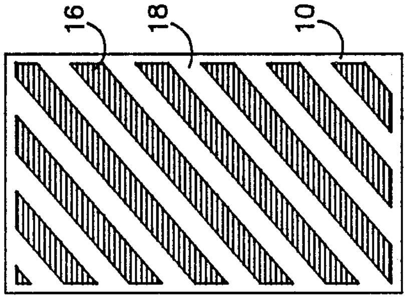
FIG. 1 is a simplified drawing of an "A" pattern as employed in practicing the invention of which this is a continuation-in-part.
Figure 2:
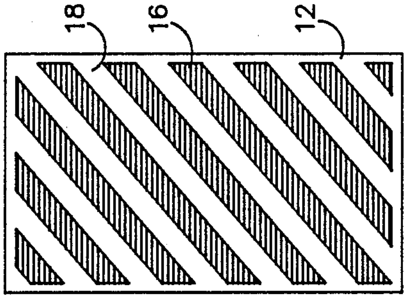
FIG. 2 is a simplified drawing of a "B" pattern as employed in practicing the invention of which this is a continuation-in-part in combination with the complementary and mutually exclusive "A" pattern of FIG. 1.
Figure 3:
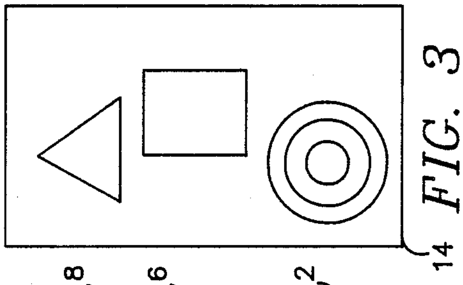
FIG. 3 is a simplified drawing of an exemplary document being sent in an example of the operation of the invention of which this is a continuation-in-part.
Figure 4:
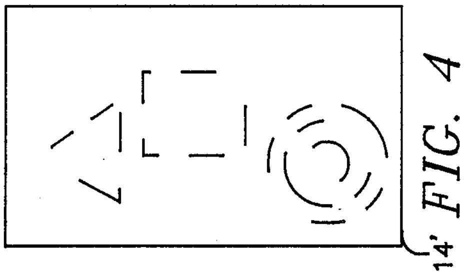
FIG. 4 is a simplified drawing of a partial document produced to facsimile transmission when scanned through the pattern of FIG. 1.
Figure 5:
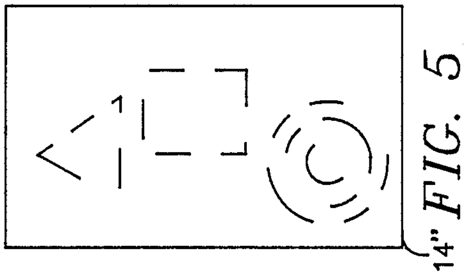
FIG. 5 is a simplified drawing of a partial document produced for facsimile transmission when scanned through the pattern of FIG. 2.

What this all means is that the width $d_1$ in the longitudinal direction along the pattern 20 of the transparent striped portions 18' is equal to the width $d_2$ in the longitudinal direction of the white striped portions 16'. Thus, as will be readily recognized and appreciated from a close inspection of the drawing of FIG. 6, if a document is placed in any "A" position on a pattern 20 having the qualities described above and copied; and then, the document is moved longitudinally a distance d which is equal to $d_1=d_2$ to a "B" position and copied, the two copies produced will be precisely registered partial documents as in FIGS. 4 and 5 just as if the two separate patterns 10 and 12 of FIGS. 1 and 2 were employed. This phenomenon is employed herein to obtain the desired objective.

Figure 8:
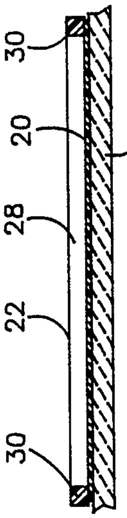
FIG. 8 is a cross section of the frame and pattern portion of FIG. 7 in the plane VIII—VIII.
Figure 7:
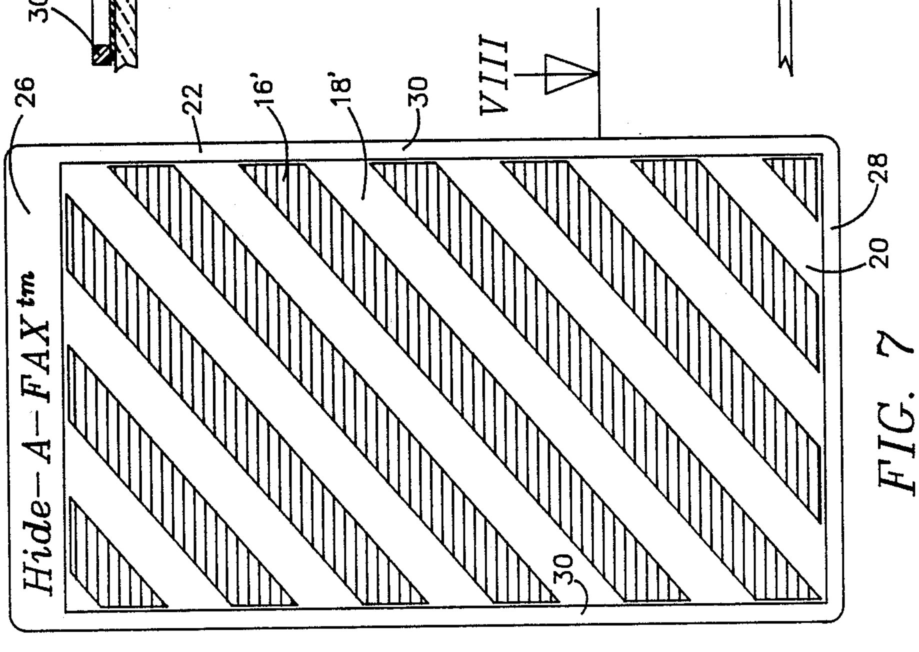
FIG. 7 is a simplified top view of the frame and pattern portion of the patterning device disclosed herein.

Turning first to FIGS. 7 and 8, the document patterning device first comprises a rectangular frame 22 having the pattern 20 affixed to the bottom thereof so as to rest directly on the cover glass 24 of the photocopy machine being employed so as to space the document being copied above the cover glass to the smallest degree possible (to affect a minimizing of movement of the document from the focal plane of the scanning apparatus of the photocopy machine. The preferred frame 22 is of one of the tough plastics presently available and comprises an upper crossbar 26, a lower crossbar 28, and a pair of parallel side members 30. The pattern 20 is preferably of a very thin sheet of a tough transparent plastic such as polycarbonate which is glued or taped to the bottom of the frame 22 as depicted in FIG. 8. The white stripe portions 16' of the pattern 20 are preferably applied by a silk screening process to the bottom surface of the pattern 20 so as to resist wear from the sliding process which takes place in using the device, as will be appreciated from the description which follows.

Figure 9:
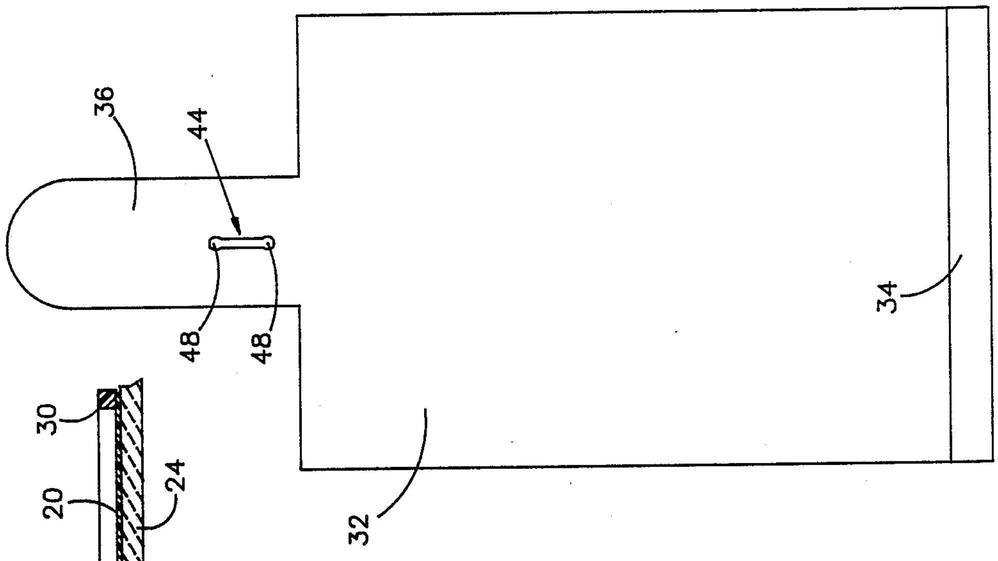
FIG. 9 is a simplified top view of the sliding member of the patterning device disclosed herein.
Figure 10:
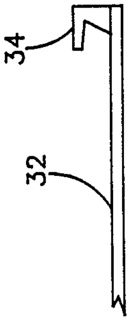
FIG. 10 is a side view of the bottom end of the sliding member of FIG. 9.

The sliding member 32 employed to affect the desired longitudinal movement of the document being copied between the "A" and "B" positions is shown in a top view in FIG. 9. The preferred sliding member 32 is rectangular in shape and of a resiliently flexible plastic. Preferably, it is of white plastic (of a white as employed in the background elements of photocopy machines) or painted white. As will be appreciated shortly, this makes the sliding member 32 self-backgrounding for documents being copied. This is particularly useful for smaller documents such as checks, photographs, or the like. As best seen in FIG. 10, a gripping lip 34 is attached along the bottom edge of the sliding member 32 whereby the sliding member 32 can be lifted and rolled back at the bottom towards the top in order to insert and remove documents. The material of the sliding member 32 at the top edge is formed into a longitudinal tab 36 having a longitudinal double keyhole slot 44 therein. The sliding member 32 is shown in a bottom view in FIG. 10. A rectangular, transparent carrier sheet 38 is hingedly attached to the sliding member 32 adjacent the top edge thereof as with tape 40. The carrier sheet 38 is also preferably of a very thin, tough, plastic such as polycarbonate.

Figure 12:
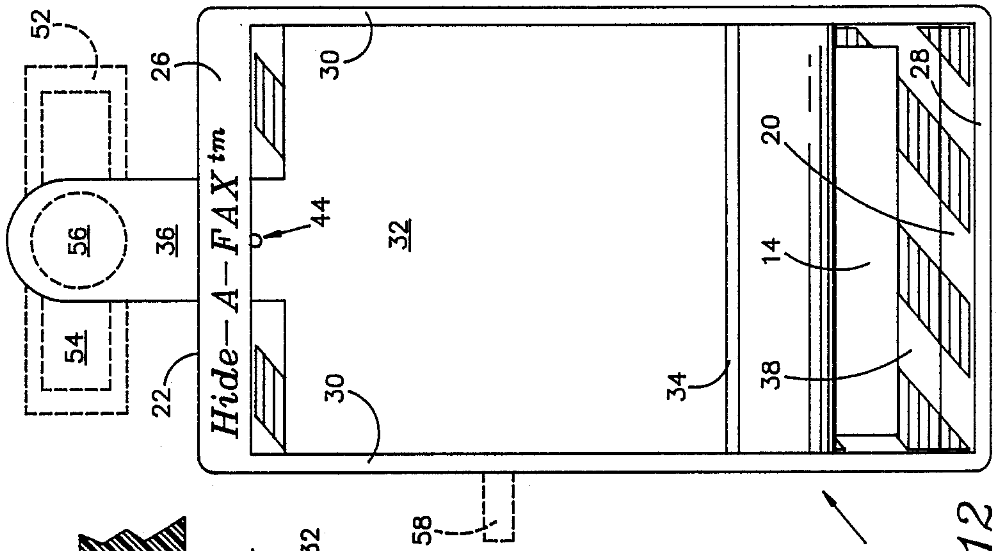
FIG. 12 is a simplified drawing of the patterning device disclosed herein in an assembled state.
Figure 13:
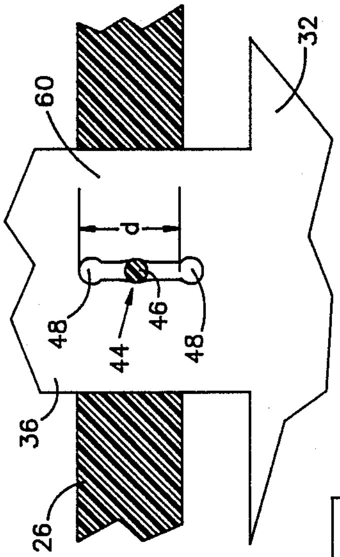
FIG. 13 is an enlarged partial top view cutaway through the detent and limit peg of the upper crossbar of the frame of the assembled patterning device of FIG. 12.

The patterning device of this application is shown assembled in FIG. 12 where it is generally indicated as 42. The sliding member 32 is disposed within the frame 22 with the carrier sheet 38 resting on the pattern 20. In use of course, the frame 22 and pattern 20 are disposed on the cover glass 24 of the copier machine (not shown) as depicted in FIG. 8. A document 14 to be copied to form the two partial documents 14′, 14″ is inserted between the carrier sheet 38 and the sliding member 32 by rolling back the sliding member 32 from the bottom as depicted in FIG. 12. Note that the width of the sliding member 32 should be such with respect to the spacing between the side members 30 of the frame 22 that the sliding member 32 slides smoothly longitudinally within the frame 22 without any binding or yaw motion. As depicted in FIG. 13, the tab 36 passes through a slot 60 between the upper crossbar 26 and the pattern 20 which can be provided by not glueing or taping the pattern 20 to the upper crossbar 26 of the frame 22 at that point. If desired (or if the thickness of the material employed for the tab 36 requires), an actual slot 60 could be formed into the upper crossbar 26.

Figure 14:
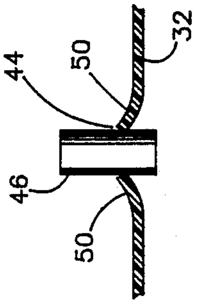
FIG. 14 is a greatly enlarged elevation view of the detent and limit peg looking longitudinally down the double keyhole slot in the sliding member of FIGS. 9 and 11.
Figure 11:
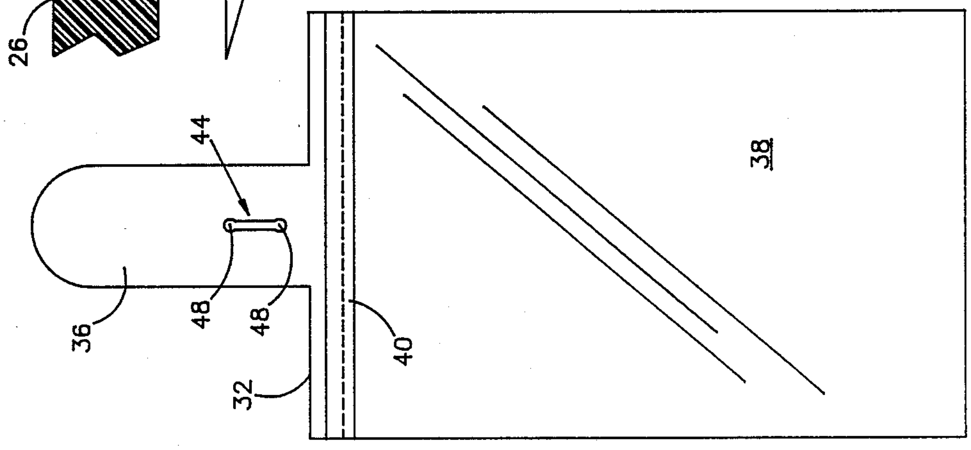
FIG. 11 is a simplified bottom view of the sliding member of FIG. 9 showing the transparent carrier sheet hingedly attached thereto.

Turning now with particularity to FIGS. 13 and 14, it can be seen that a detent and limit peg 46 carried by the upper crossbar 26 passes through the double keyhole slot 44. The peg 46 can be formed into the upper crossbar 26 or be inserted through the upper crossbar 26 as a separate item, as best suits the implementation and manufacturing technique employed for the device 42. Note that, as depicted in FIG. 13, the length of the slot 44 is such as to limit the longitudinal movement of the sliding member 32 to the required distance d between the "A" and "B" positions with respect to the striped portions 16′, 18′ of the pattern 20 as described earlier with respect to FIG. 6. The diameter of the peg 46 is chosen to be substantially equal to the diameter of the two holes 48 on the ends of the slot 44. Accordingly, as depicted in FIG. 14, as the sliding member 32 is moved longitudinally (by pulling or pushing longitudinally on the tab 36) between one of the holes 48 and the other, the side portions 50 of the material of the sliding member must deform slightly in order for the peg 46 to pass therebetween. Thus, the peg 46 in combination with the slot 44 not only performs a longitudinal motion limiting function; but, additionally, functions as a detent tending to retain the sliding member 32 in either the "A" or "B" position for proper registration.

From the foregoing description, it should now be apparent how the patterning device 42 is used and how it functions. The device 42 is placed on the cover glass 24 of a photocopy machine and a document 14 to be copied is placed in it between the carrier sheet 38 and the sliding member 32 and then the cover lid (not shown) of the photocopy machine is lowered onto the top of the frame 22 to hold the device 42 in position. To aid in this objective, one may wish to attach the pattern 20 to the bottom of the frame 22 with a tape having a high coefficient of friction or, alternatively, use such a tape on the bottom edges after gluing the pattern 20 to the frame 22. The tab 36 (which preferably is of a length to stick out from under the cover lid) is gripped and pulled or pushed to place the sliding member 32 in either the "A" or "B" position. The detent action of the peg 46 in the slot 44 tends to pull the sliding member 32 into the selected position and hold it there. A first copy is then made. The tab 36 is then gripped and pulled or pushed to overcome the detent action of the slot 44 and peg 46 and place the sliding member 32 securely in the other (i.e. "A" or "B") position and a second copy made. These two copies are the desired partial documents 14′, 14″ as desired.

As those skilled in the art will undoubtedly have realized from the foregoing description, when copying a document 14 with the device 42 of FIG. 12 to make two copies which are the desired partial documents 14′, 14″ for secure transmission, the document 14 is shifted longitudinally by the distance d of the pattern offset as described above. Normally, where the distance d is in the order of a half inch and the document 14 is a standard document having inch margins at the top and bottom, the shifting of the document 14 will not cause a problem of lost data at the top or bottom (depending on the initial placement of the frame 22 on the cover glass 24 of the photocopy machine being employed). Where this is a problem, however, the alternate approach shown ghosted in FIG. 12 can be employed. An attaching member 52 is permanently affixed to an area of the photocopy machine (on the cover glass 24 or adjacent thereto) over which the tab 36 will overlap. The attaching member 52 contains one half 54 of a touch fastener material such as that sold under the trademark Velcro on the upper surface thereof and can be conveniently attached, for example, with an adhesive backing thereon of a type well known in the art and often used for such purposes. The mating half 56 of the touch fastener material is adhesively attached to the bottom of the tab 36. For convenience in using this approach, it is also convenient to have a position shifting rod 58 projecting outward from one of the side members. The use of a high friction material on the bottom of the frame should also be avoided and the cover lid of the photocopy machine should be left raised with the document backgrounding functions being performed by the white slider member 32. To employ the device 42 in this mode, the slider member 32 is positioned over the cover glass 24 of the photocopy machine such that it will be fully copied in the area to be occupied by the document 14. The touch fastener halves 54, 56 are then pressed together to attach the tab 36 to the photocopy machine. The frame 22 is then slid to either the "A" or "B" position (the slider 32 remaining fixed). The document 14 is then inserted between the slider member 32 and the carrier sheet 38 in the usual manner and copied. The frame 22 is then slid to the other of the "A" and "B" positions (the slider 32 again remaining fixed so that no shifting of the document 14 on the cover glass 24 takes place) and the second copy made. Thus, there is no potential for loss of data regardless of the lack of top and bottom margins on the document 14 and the size of the pattern displacement distance d.

Additionally, while the preferred embodiment of this invention as described hereinbefore is of a simple construction for ease of manufacture and low cost, it is recognized by the inventors herein that a more complex structure could be employed to affect the sliding movement between the frame and the sliding member. For example, the sliding member could be incorporated into a second frame. The side members could be in the form of rods or bars which pass through the second frame. Also, the movement of the sliding member could be affected though an intermediate device such as a rod or lever. Separate mechanical detents could be employed. All these variations have been considered and rejected in favor of simplicity in the preferred embodiment; however, they are considered to be within the scope and spirit of the invention as disclosed herein and as claimed hereinafter.

Wherefore, having thus described our invention, what is claimed is:

1. A device for photocopying a document employing a standard photocopy machine having a cover glass upon which documents to be copied are placed to produce two partial documents each containing portions of the document which are complementary and mutually exclusive, said device comprising:
(a) a transparent sheet sized to be placed on the cover glass and having a pattern thereon of white and transparent portions which are complementary along longitudinally equal shift distances;
(b) holder means for holding a document over said pattern and disposed on said transparent sheet; and,
(c) moving means for moving said holder means between a first position and a second position located longitudinally at said equal shift distance from said first position.

2. The device of claim 1 wherein said holder means is slidable on said transparent sheet between said first and second position and additionally comprising:
stop means for preventing said holder means from sliding longitudinally a distance longer than between said first and second positions.

3. The device of claim 1 wherein said holder means is slidable on said transparent sheet between said first and second position and additionally comprising:
detent means for resiliently holding said holder means in said first and second positions.

4. The device of claim 1 wherein said holder means is slidable on said transparent sheet between said first and second position and additionally comprising:
combined stop and detent means for preventing said holder means from sliding longitudinally a distance longer than between said first and second positions and for resiliently holding said holder means in said first and second positions.

5. The device of claim 4 wherein said combined stop and detent means comprises:
(a) a double keyhole slot longitudinally disposed in said holder means and having circular holes on ends thereof separated by a connecting slot of a width less than a diameter of said holes; and,
(b) a peg carried by said transparent sheet and a diameter equal to said holes disposed through said double keyhole slot.

6. The device of claim 1 and additionally comprising:
(a) a rectangular frame having said transparent sheet attached to a bottom surface thereof and including parallel side members spaced such that a document to be photocopied can be disposed between them; and wherein,
(b) said holder means is slidably carried by said rectangular frame.

7. The device of claim 6 wherein said holder means comprises:
(a) a rectangular top member slidably disposed between said side members; and,
(b) a transparent, rectangular carrier member slidably disposed on said transparent sheet and attached to said top member for sliding movement in combination therewith whereby a document to be photocopied can be placed between said top member and said carrier member to move in combination therewith.

8. The device of claim 7 wherein:
said carrier member is hingedly attached to said top member adjacent a top end thereof and said top member is resiliently flexible whereby said top member can be rolled away from said carrier member towards said top end to allow a document to be placed between said top member and said carrier member or be removed therefrom.

9. The device of claim 7 wherein:
said top member includes a gripping tab means extending beyond said frame for gripping to move said top member between said first and second positions.

10. The device of claim 9 wherein said gripping tab means and said frame include:
combined stop and detent means for preventing said top member from sliding longitudinally a distance longer than between said first and second positions and for resiliently holding said top member in said first and second positions.

11. The device of claim 10 wherein said combined stop and detent means comprises:
(a) a double keyhole slot longitudinally disposed in said gripping tab means and having circular holes on ends thereof separated by a connecting slot of a width less than a diameter of said holes; and,
(b) a peg carried by said frame and of a diameter equal to a diameter of said holes disposed through said double keyhole slot.

12. The device of claim 9 and additionally comprising:
means for releasably attaching said gripping tab means to a surface of the photocopy machine whereby said frame can be moved relative to said top member to affect relative movement between said first and second positions.

13. A patterning device for photocopying a document employing a standard photocopy machine having a cover glass upon which documents to be copied are placed to produce two partial documents each containing portions of the document which are complementary and mutually exclusive, said device comprising:
(a) a transparent sheet sized to be placed on the cover glass and having a pattern thereon of white and transparent portions which are complementary along longitudinally equal shift distances;
(b) a rectangular frame having said transparent sheet attached to a bottom surface thereof and including parallel side members spaced such that a document to be photocopied can be disposed between them;
(c) holder means disposed within said frame and on said transparent sheet between said side members for holding a document over said pattern and for longitudinal sliding movement between a first position and a second position located at said equal shift distance from said first position; and,
(d) moving means for moving said holder means between said first position and said second position.

14. The patterning device of claim 13 and additionally comprising:
stop means for preventing said holder means from sliding longitudinally a distance longer than between said first and second positions.

15. The patterning device of claim 13 and additionally comprising:
detent means for resiliently holding said holder means in said first and second positions.

16. The patterning device of claim 13 and additionally comprising:
combined stop and detent means for preventing said holder means from sliding longitudinally a distance longer than between said first and second positions and for resiliently holding said holder means in said first and second positions.

17. The patterning device of claim 16 wherein said combined stop and detent means comprises:

(a) a double keyhole slot longitudinally disposed in said holder means and having circular holes on ends thereof separated by a connecting slot of a width less than a diameter of said holes; and, (b) a peg carried by said transparent sheet and of a diameter equal to said holes disposed through said double keyhole slot.

18. The patterning device of claim 13 wherein said holder means comprises:

(a) a rectangular top member slidably disposed between said side members; and, (b) a transparent, rectangular carrier member slidably disposed on said transparent sheet and attached to said top member for sliding movement in combination therewith whereby a document to be photocopied can be placed between said top member and said carrier member to move in combination therewith.

19. The patterning device of claim 18 wherein:

said carrier member is hingedly attached to said top member adjacent a top end thereof and said top member is resiliently flexible whereby said top member can be rolled away from said carrier member towards said top end to allow a document to be placed between said top member and said carrier member or be removed therefrom.

20. The patterning device of claim 18 wherein:

said top member includes a gripping tab means extending beyond said frame for gripping to move said top member between said first and second positions.

21. The patterning device of claim 20 wherein said gripping tab means and said frame include:

combined stop and detent means for preventing said top member from sliding longitudinally a distance longer than between said first and second positions and for resiliently holding said top member in said first and second positions.

22. The patterning device of claim 21 wherein said combined stop and detent means comprises:

(a) a double keyhole slot longitudinally disposed in said gripping tab means and having circular holes on ends thereof separated by a connecting slot of a width less than a diameter of said holes; and, (b) a peg carried by said frame and of a diameter equal to a diameter of said holes disposed through said double keyhole slot.

23. The patterning device of claim 20 and additionally comprising:

means for releasably attaching said gripping tab means to a surface of the photocopy machine whereby said frame can be moved relative to said top member to affect relative movement between said first and second positions.

24. A patterning device for photocopying a document employing a standard photocopy machine having a cover glass upon which documents to be copied are placed to produce two partial documents for secure transmission each containing portions of the document which are complementary and mutually exclusive, said device comprising:

(a) a transparent sheet sized to be placed on the cover glass and having a pattern thereon of white and transparent portions which are complementary along longitudinally equal shift distances;

(b) a rectangular frame having said transparent sheet attached to a bottom surface thereof and including parallel side members spaced such that a document to be photocopied can be disposed between them;

(c) holder means disposed within said frame and on said transparent sheet between said side members for holding a document over said pattern and for longitudinal sliding movement between a first position and a second position located at said equal shift distance from said first position, said holder means comprising, (c1) a rectangular top member slidably disposed between said side members, and (c2) a transparent, rectangular carrier member slidably disposed on said transparent sheet and attached to said top member for sliding movement in combination therewith whereby a document to be photocopied can be placed between said top member and said carrier member to move in combination therewith;

(d) moving means for moving said holder means between said first position and said second position; and, (e) combined stop and detent means for preventing said holder means from sliding longitudinally a distance longer than between said first and second positions and for resiliently holding said holder means in said first and second positions.

25. The patterning device of claim 24 wherein said combined stop and detent means comprises:

(a) a double keyhole slot longitudinally disposed in said holder means and having circular holes on ends thereof separated by a connecting slot of a width less than a diameter of said holes; and, (b) a peg carried by said frame and of a diameter equal to said holes disposed through said double keyhole slot.

26. The patterning device of claim 24 wherein:

said carrier member is hingedly attached to said top member adjacent a top end thereof and said top member is resiliently flexible whereby said top member can be rolled away from said carrier member towards said top end to allow a document to be placed between said top member and said carrier member or be removed therefrom.

27. The patterning device of claim 24 wherein:

said top member includes a gripping tab means extending beyond said frame for gripping to move said top member between said first and second positions.

28. The patterning device of claim 27 and additionally comprising:

means for releasably attaching said gripping tab means to a surface of the photocopy machine whereby said frame can be moved relative to said top member to affect relative movement between said first and second positions.

* * * * *